Sept. 21, 1965 J. JONES-HINTON ET AL 3,207,821
MANUFACTURE OF SHAPED ARTICLES
Filed Oct. 2, 1961 2 Sheets-Sheet 1
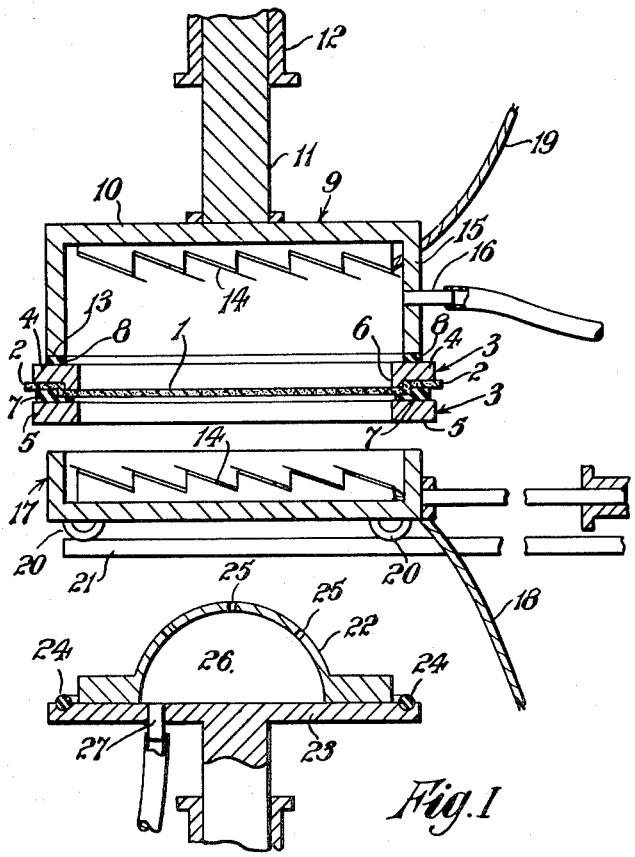
Fig. I
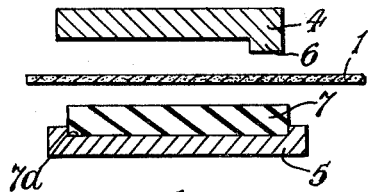
Fig. III
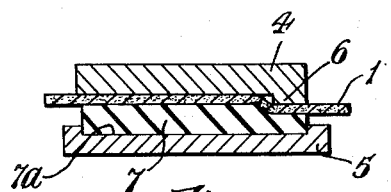
Fig. IV
Inventors
James Jones-Hinton
Thomas E. H Gray
By Stevens Davis Miller & Mosher
Attorneys

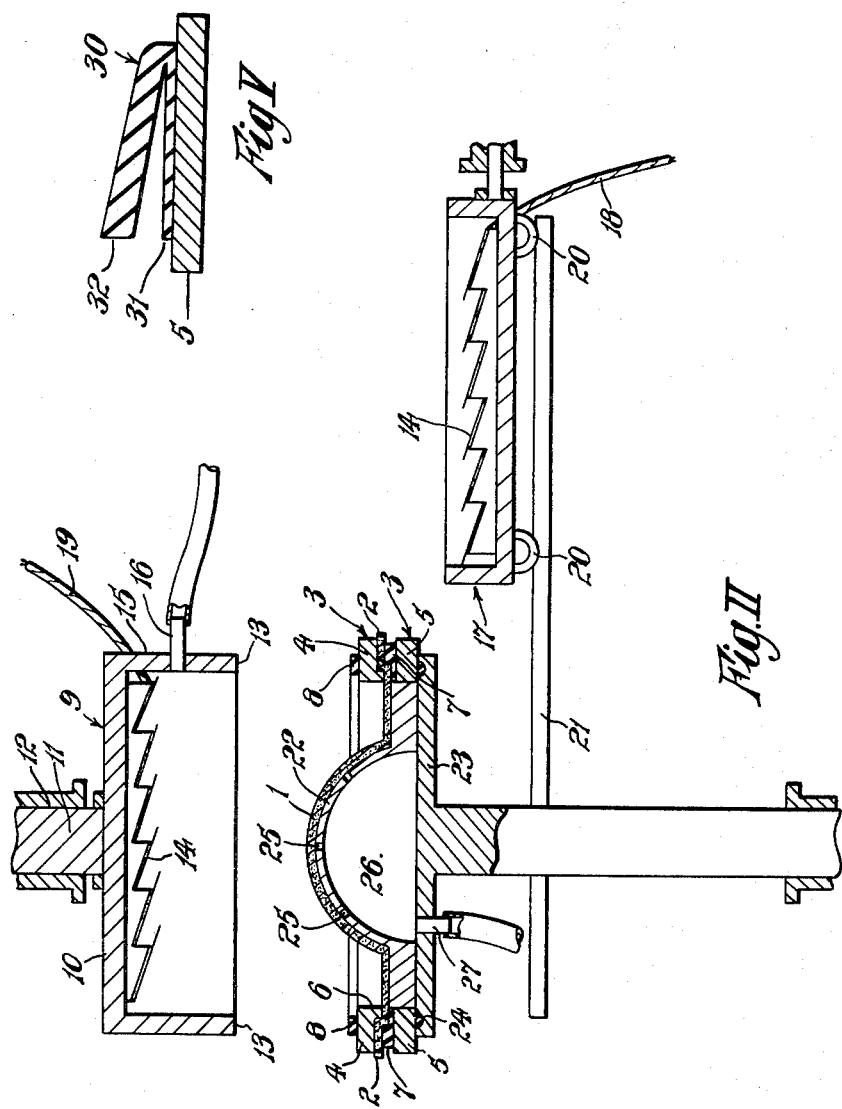

3,207,821
MANUFACTURE OF SHAPED ARTICLES
James Jones-Hinton, Tanworth-in-Arden, Solihull, and Thomas Edward Horace Gray, Wylde Green, Sutton Coldfield, England, assignors to Dunlop Rubber Company Limited, London County, England, a British company
Filed Oct. 2, 1961, Ser. No. 142,111
Claims priority, application Great Britain, Oct. 21, 1960, 36,090/60; Jan. 19, 1961, 2,150/61
2 Claims. (Cl. 264—92)

This invention relates to improvements in the manufacture of shaped articles and more particularly in the method known as vacuum forming.

Forming shaped articles from sheets of thermoplastic material by the method of vacuum forming is brought about by arranging for a sheet of the material clamped around its edge and softened by the application of heat to be pressed intimately against a shaping former by withdrawing the air from the space between the sheet and shaping former. It has been found that the sheet tends to sag whilst being heated prior to shaping and this is disadvantageous, since articles formed from such sheets are often faulty and must be rejected. Therefore, there is a need for a method of heating sheets in which the tendency to sag is reduced.

According to the invention, a method of shaping a sheet of thermoplastic material by the method of vacuum forming includes the step of softening the sheet by heating and reducing the pressure on the upper surface of the sheet, whereby the sheet is retained in substantially-planar configuration as it softens.

The invention also includes a method of shaping a sheet of thermoplastic material which comprises securely clamping the sheet in clamping means, heating the sheet and reducing the pressure of the upper surface thereof to maintain the sheet in substantially-planar configuration as it softens, bringing a shaping former adjacent one surface of said sheet when soft and evacuating the space between said soft sheet and said shaping former to cause said sheet to conform to the profile of said former and allowing the shaped sheet to cool and set.

In the method of softening a sheet of thermoplastic material according to the invention, the difference in pressure between the upper surface and the lower surface of the sheet brought about when the pressure on the upper surface is reduced, is such that any tendency of the sheet to sag as it is softening is counteracted and kept to a minimum. Generally, the difference in pressure per unit area of sheet is of the order of the weight per unit area of the sheet. It may be necessary to vary the reduction in pressure as the sheet softens to maintain the sheet in substantially-planar configuration.

The method of softening sheet material according to the invention is advantageous in that sagging of the sheet whilst being softened is greatly reduced and also uniform heating of the sheet is possible. The method is particularly advantageous when large sheets of thermoplastic material are to be softened. The possibility of sagging is increased with large sheets and rejection of faulty articles in an expensive procedure. Large sheets can now be softened with very little possibility of sagging taking place and the method is quickly and easily incorporated into the cycle of operations of existing vacuum forming apparatus.

During operation of the method in accordance with the invention, it is necessary to clamp the sheet securely around its periphery to retain the sheet in the desired position and also to prevent the ingress of air while the sheet is being heated and subsequently during vacuum forming. This is of particular importance when large sheets are being shaped due to the large force required to effect secure clamping and also due to the variations in thickness which can occur in large sheets.

One method of softening a sheet of thermoplastic material and subsequently shaping the softened sheet into an article according to the invention, will now be described by way of example, with reference to the accompanying drawing, in which:

FIGURE I is a diagrammatic cross-section of the apparatus employed during softening the sheet,
FIGURE II is a diagrammatic cross-section of the apparatus during shaping of the sheet,
FIGURES III and IV are diagrammatic part-views of the clamping means, and
FIGURE V is a part-view of an alternative form of the clamping means.

A sheet 1 of polypropylene having a size of approximately 8 ft. x 4 ft. and a weight of 2 lbs. per square foot, is placed in a vacuum forming machine and the edges 2 of the sheet 1 are clamped in a composite framework 3.

The composite framework 3 consists of two rectangular metal frames 4, 5 one 4 of which is formed from metal plates having an L-shaped cross-section with one of the limbs 6 being much shorter than he other and, in fact, constituting the abutment. The frame 4 forms the upper frame with its short limb 6 extending downwardly at its inner periphery. The upper frame 4 has an external periphery slightly less in size than the sheet 1 and each metal plate constituting the sides of the frame may have a width of from 4 to 12 inches and a thickness of about 1 inch depending on the size of the sheet to be shaped.

The other rectangular metal frame 5 forms the lower frame and is formed from metal plates having a rectangular cross-section with a width slightly larger than those used for the upper frame 4 but a similar thickness. A strip 7 of rubber is secured around the upper surface of the lower frame 5 in a groove 7a. Normally the lower frame 5 will be secured to, or formed integral with, some part of the vacuum forming machine and so constitutes a supporting member for the sheet.

The sheet 1 of thermoplastic material to be softened and subsequently shaped, is placed so as to rest upon the strip 7 of rubber and with its outer periphery outwardly of the strip 7 of rubber. The upper frame 4 is placed in position above the sheet and the two frames 4, 5 are retained closely-adjacent by means of members hingedly connected to a part of the vacuum forming apparatus, or by some other means. The sheet 1 is deformed by the short limb 6 of the frame 4 as the two frames are brought together and is urged into intimate contact with the surface of the upper frame 4 and the rubber strip 7, the deformation being accommodated by the rubber strip 7. The sheet is therefore prevented from moving inwardly.

A seal 8 consisting of a strip of heat-resistant elastomeric material is placed around the upper surface of the upper frame 4. Examples of suitable materials for use as the seal 8 are silicone rubber, polyurethane, or neoprene rubber.

An upper heating unit 9 consisting of a vertically movable rectangular box 10 mounted on a vertical plunger 11 in a cylinder 12 and having an open lower side is then lowered over the sheet 1 so that its free edges 13 make an airtight seal with the upper frame 4 through the strip 8 of elastomeric material. The box 10 contains electrical heating elements 14 which are positioned across the box and above the sheet 1. One side 15 of the box 10 is provided with an outlet tube 16 through which the interior of the box 10 can be evacuated.

A lower heating unit 17 consisting of a series of electrical heating elements 14 similar to those in the upper heating unit 9 is positioned below the sheet material and both heating units connected to a power supply by cables 18, 19 and switched on. In the heating units 9, 17, the heating elements 14 are arranged in side-by-side and overlapping relationship with a gap being formed between the elements in the region of overlap. These heating elements and, in particular, a heater containing such elements form the subject of our copending British patent application No. 6,605/61, now Patent No. 972,823. The elements 14 uniformly heat the sheet 1 to bring about softening thereof.

The lower heating unit 17 is mounted by means of wheels 20 on rails 21 and can be rolled away from below the sheet 1.

As the sheet 1 is softened, the pressure on the upper side of the sheet 1 is reduced by withdrawing air from within the rectangular box 10 through the outlet tube 16 using a vacuum pump until a drop in pressure of about 2 lbs. per square foot is achieved. Any tendency for the sheet to sag whilst being heated is counteracted by this means.

When the sheet 1 is sufficiently soft the lower heating unit 17 is removed by rolling on rails 21 and a shaping former 22 mounted on a piston 23 is raised upwards into close proximity to the under-surface of the sheet 1 so that the piston is sealed air-tightly by means of seal 24 with the lower frame 5. The shaping former 23 has the form of an upturned hull of a small boat and is provided with vents 25 passing through the surface of the former and is hollow. The upper heating unit 9 is then lifted away from the sheet material thereby breaking the air-tight seal between the lower edges 13 of the rectangular box 10 and clamping means. The shaping former 22 is moved upwards so that the soft sheet 1 is brought into contact with the shaping surface and air is withdrawn from the interior 26 of the former 22 through a vent 27 in the piston surface. The sheet 1 is therefore pressed into intimate contact with the shaping surface and any air which could become trapped between the sheet 1 and former 22 escapes to the interior 26 thereof through the vents 25 in the former 22. This is shown in FIGURE II.

After the sheet 1 has been allowed to cool and set a hull of a boat can be separated from the former 22. The hull has substantially a constant thickness through its structure and very few flaws, if any.

Whilst the sheet is being softened by the application of heat it is often advisable to continually withdraw air from above the sheet after reducing the pressure to the desired level. Continually withdrawing air in this manner counteracts any increase in pressure which can take place due to an increase in temperature and the air can be withdrawn using a small vacuum pump or using a vacuum bleed attachment to a vacuum reservoir. It is also possible to arrange a control system to automatically switch on the vacuum pump if the sheet should sag below a certain limit as it is being heated. For instance, the sheet can be made to break the beam of a photoelectric cell and thereby cause an electrical relay to bring the pump into operation.

The method of forming shaped articles according to the invention can be carried out using a wide variety of shaping formers, and although it is usual for such formers to be mounted on a movable piston, they can be rigidly placed if desired and the softened sheet material moved into contact with them. Typical articles which can be manufactured from the softened sheet material are ships' hulls, dishes, buckets, plates, ash-trays and other articles which are normally produced by vacuum forming.

Any thermoplastic material which can be obtained in sheet form can be softened and shaped according to the present invention. Typical examples of the thermoplastic material are plasticised or unplasticised vinyl resins, polyolefins such as polyethylene and polypropylene, and polyacrylates.

Having now described our invention, what we claim is:

1. A method of forming a shaped article from a large flat sheet of thermoplastic material by the method of vacuum forming wherein the sheet is clamped around its peripheral edges only and softened by the application of heat before a shaped former is brought into contact with the sheet, comprising the steps of clamping the sheet around its entire peripheral edge and leaving the remaining portion of said sheet within the area defined by said peripheral edge without any means of support and disposed in a planar configuration, positioning a heating and vacuum chamber over said clamped sheet so as to form a fluid-tight seal with the clamped peripheral edge of said sheet and enclosing said area within said clamped edge, simultaneously heating said sheet until it is soft and maintaining a vacuum on the upper surface of said area to maintain it in said substantial planar configuration to prevent sagging of it, and thereafter bringing an evacuable former enclosure into contact with the under surface of said area and shaping it and simultaneously maintaining a vacuum on said undersurface area, and then cooling and setting said shaped sheet.

2. A method of shaping a sheet of thermoplastic material which comprises establishing an evacuable enclosure partly defined by the sheet of thermoplastic material to be shaped and positioned above said sheet, heating both the upper and lower surfaces of the sheet to effect softening of the sheet, clamping the sheet around its outer periphery as it is heated, maintaining the sheet in an elevated temperature while simultaneously withdrawing air from said evacuable enclosure to reduce the pressure on the entire upper surface of the sheet, and to maintain the sheet in substantially planar configuration as it softens to prevent it from sagging, establishing a further evacuable enclosure defined at least in part by said sheet and by a shaping former, evacuating the further evacuable enclosure when the sheet is soft and causing said sheet to conform to the profile of said former, and allowing the shaped sheet to cool and set.

References Cited by the Examiner

UNITED STATES PATENTS

| | | | |
|---|---|---|---|
| 2,493,439 | 1/50 | Braund | 264—92 |
| 2,531,539 | 11/50 | Smith | 18—19 |
| 2,702,411 | 2/55 | Winstead | 18—56 |
| 2,765,493 | 10/56 | Winstead | 18—19 |
| 2,814,074 | 11/57 | Butzko | 18—19 |
| 2,830,818 | 4/58 | Otto | 18—56 XR |
| 3,115,677 | 12/63 | Thiel | 264—92 |

FOREIGN PATENTS

| | | |
|---|---|---|
| 1,187,197 | 3/59 | France. |
| 1,222,566 | 1/60 | France. |
| 550,507 | 1/43 | Great Britain. |

ROBERT F. WHITE, *Primary Examiner.*

WILLIAM STEPHENSON, ALEXANDER H. BRODMERKEL, *Examiners.*